United States Patent
Ullrich

(10) Patent No.: US 7,311,075 B2
(45) Date of Patent: Dec. 25, 2007

(54) SPLIT PISTON FOR AN INTERNAL COMBUSTION ENGINE

(75) Inventor: Michael Ullrich, Möglingen (DE)

(73) Assignee: Mahle GmbH, Stuttgart (DE)

( * ) Notice: Subject to any disclaimer, the term of this patent is extended or adjusted under 35 U.S.C. 154(b) by 143 days.

(21) Appl. No.: 10/568,795

(22) PCT Filed: Aug. 19, 2004

(86) PCT No.: PCT/DE2004/001852

§ 371 (c)(1), (2), (4) Date: Feb. 17, 2006

(87) PCT Pub. No.: WO2005/019631

PCT Pub. Date: Mar. 3, 2005

(65) Prior Publication Data

US 2006/0225568 A1    Oct. 12, 2006

(30) Foreign Application Priority Data

Aug. 19, 2003  (DE) .............................. 103 37 961

(51) Int. Cl.
*F02F 3/00* (2006.01)
(52) U.S. Cl. .................. 123/193.6; 92/217; 92/220
(58) Field of Classification Search .................. 92/216, 92/217, 220, 208, 255, 256, 258; 123/193.6
See application file for complete search history.

(56) References Cited

U.S. PATENT DOCUMENTS

| | | | |
|---|---|---|---|
| 1,723,187 A | 8/1929 | Lemieux | |
| 1,723,823 A | 8/1929 | Teetor | |
| 1,900,991 A * | 3/1933 | Matheson | 92/189 |
| 1,965,417 A * | 7/1934 | Kurth | 92/206 |
| 2,198,771 A * | 4/1940 | Hazen et al. | 92/176 |
| 4,031,868 A * | 6/1977 | Karaba et al. | 123/78 B |
| 4,667,627 A | 5/1987 | Matsui et al. | |
| 5,081,968 A * | 1/1992 | Bruni | 123/193.6 |
| 6,216,585 B1 * | 4/2001 | Chellappa | 92/220 |
| 6,729,291 B1 | 5/2004 | Scharp et al. | |
| 2003/0167918 A1 | 9/2003 | Kemnitz et al. | |

FOREIGN PATENT DOCUMENTS

| | | |
|---|---|---|
| DE | 547 233 | 4/1932 |
| DE | 843 924 | 7/1952 |
| DE | 856 535 | 11/1952 |
| DE | 969 838 | 7/1958 |
| DE | 22 12 922 A | 9/1973 |

(Continued)

*Primary Examiner*—Marguerite McMahon
(74) *Attorney, Agent, or Firm*—Collard & Roe, P.C.

(57) ABSTRACT

The invention relates to a split piston for an internal combustion engine, comprising an upper piece, connected to a lower piece, by means of a screw connection. The screw connection comprises a tubular connector piece, mounted on the underside of the piston upper piece with an external thread, a spacer sleeve with an external and an internal thread and a support rib formed on the lower piece of the piston with an internal thread. The upper piece can thus be screwed to the lower piece, by means of the connector piece, the spacer sleeve and the support rib. The spacer sleeve acts as a compressing body and the connector piece as an extending body, to generate the mechanism tension necessary for fixing the screw connection.

5 Claims, 2 Drawing Sheets

FOREIGN PATENT DOCUMENTS

| | | |
|---|---|---|
| DE | 106677 | 6/1974 |
| DE | 123962 | 1/1977 |
| DE | 37 19 469 A | 12/1988 |
| EP | 0 469 666 A | 2/1992 |
| FR | 987 818 | 8/1951 |
| FR | 1337 311 | 8/1963 |
| JP | 60135653 A | 7/1985 |
| NL | 60 092 C | 5/1947 |

* cited by examiner

SPLIT PISTON FOR AN INTERNAL COMBUSTION ENGINE

CROSS REFERENCE TO RELATED APPLICATIONS

Applicant claims priority under 35 U.S.C. §119 of German Application No. 103 37 961.4 filed Aug. 19, 2003. Applicant also claims priority under 35 U.S.C. §365 of PCT/DE2004/001852 filed Aug. 19, 2004. The international application under PCT article 21(2) was not published in English.

The invention relates to a multi-part piston for an internal combustion engine, in accordance with the preamble of claim 1.

A multi-part piston for an internal combustion engine is known from the German patent 969 838, which consists of a main piston body and a crown part connected with it by means of expansion screws. In order to guarantee a secure screw connection even at faster back and forth movements of the piston, a greater number of expansion screws are required for assembly of the crown part to the main piston body. This has the disadvantages that assembly of the known piston is very time-consuming and labor-intensive.

It is the task of the invention to avoid these disadvantages of the state of the art. This task is accomplished with the characteristics according to the characterizing part of the main claim. Practical embodiments of the invention are the object of the dependent claims.

The advantages of quick, easy, and reliable assembly of the piston according to the invention are achieved in that here, an intermediate sleeve is first screwed into a ring rib of the lower part of the piston, after which the entire upper part of the piston is screwed into the intermediate sleeve. In this connection, the intermediate sleeve acts as a compressing body that produces a mechanical stress that serves to fix the screw connection in place.

Figure 1:
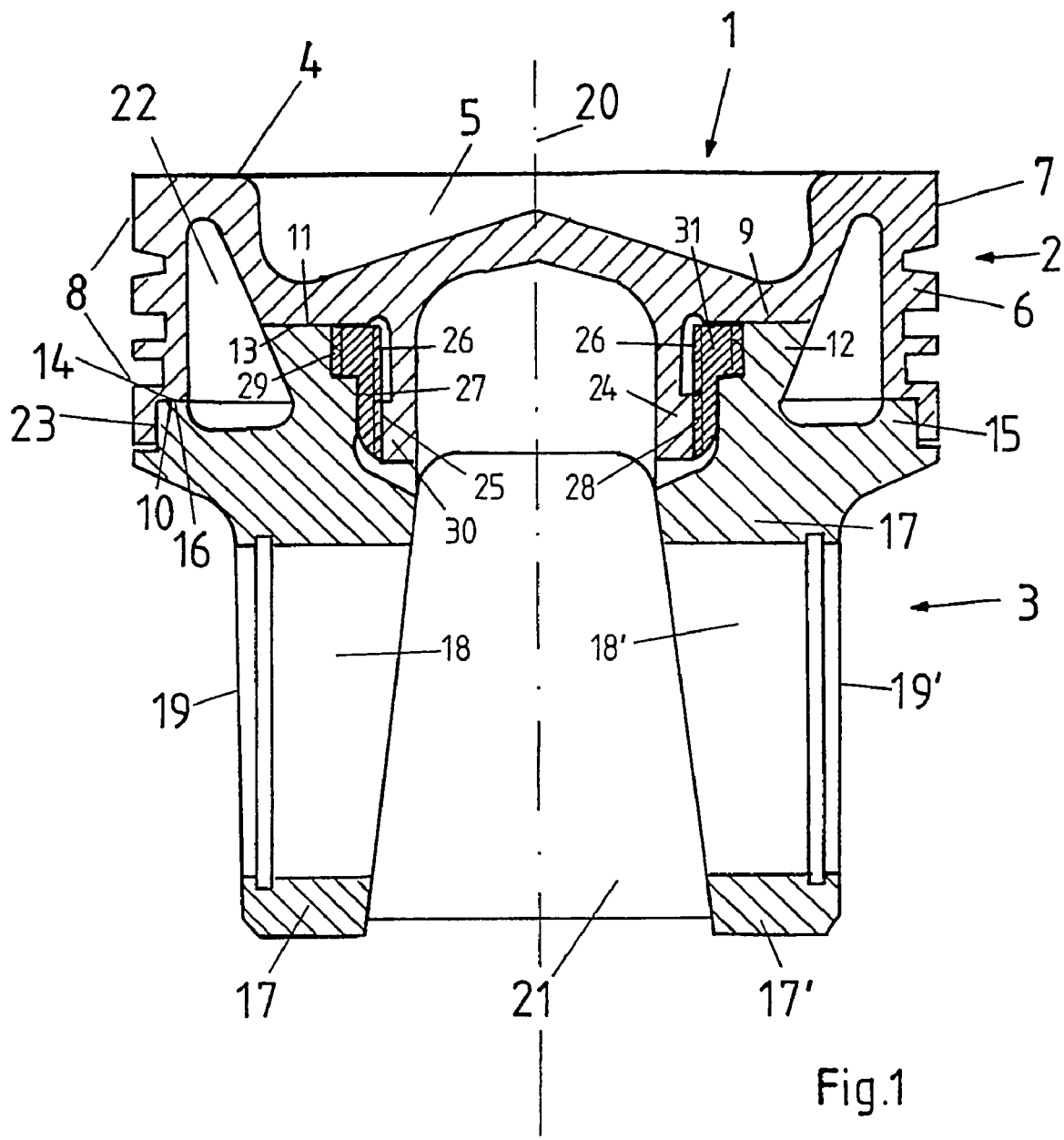
Figure 2:
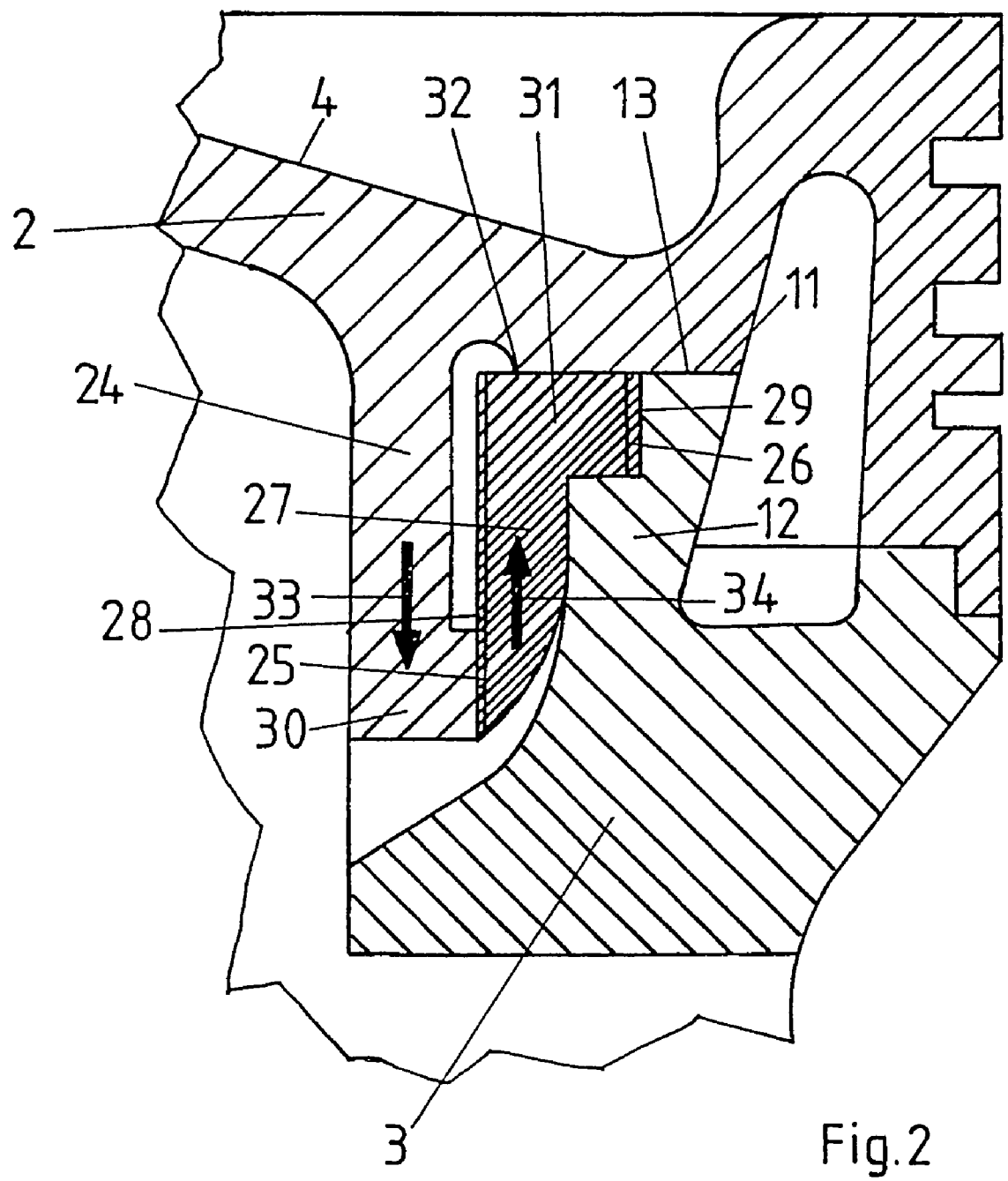

The invention is described below, using the drawings. These show:

FIG. 1 a two-part piston in cross-section, the upper part of which is screwed to its lower part by way of an intermediate sleeve, and FIG. 2 an enlarged cross-sectional view of a detail of the piston, with the intermediate sleeve according to the invention.

FIG. 1 shows a multi-part cooled piston 1, which consists of an upper part 2 and a lower part 3. The upper part 2 and the lower part 3 are made of steel. The piston crown 4, the inner region of which has a combustion bowl 5, is formed by the upper part 2. A ring wall 6 is molded onto the outer edge of the piston crown 4, the outer surface of which wall forms the top land 7, on the piston crown side, which land is followed by the ring belt 8 having ring grooves for accommodating piston rings, not shown in the figure.

Two pin bosses 17, 17' each having a pin bore 18, 18', respectively, are disposed on the side of the lower part 3 that faces away from the piston crown 4, the faces 19, 19' of which are disposed to be set back relative to the ring wall 6, in the direction of the piston longitudinal axis 20. Piston skirt elements 21 are connected with the pin bosses 17, 17' and the lower part 3 of the piston 1.

The upper part 2 and the lower part 3 of the piston 1 are connected with one another, for one thing, by way of an inner contact region 9 and, for another, by way of an outer contact region 10 that is disposed concentric to the former. The inner contact region 9 is formed by a contact surface 11 that is disposed on the side of the upper part 2 that faces away from the combustion bowl 5, and by a contact surface 13 that is disposed on a ring-shaped support rib 12 of the lower part 3, on the piston crown side. The outer contact region 10 is formed by a contact surface 14 that delimits the underside of the ring wall 6, and by a contact surface 16 that is disposed on a ring-shaped support land 15 of the lower part 3, on the piston crown side.

A cooling channel 22, disposed in the edge region of the piston crown 4, is formed by upper part 2 and lower part 3 of the piston 1, the radially outer delimitation of which channel is formed by the ring wall 6, its radially inner delimitation partly by the support rib 12 and partly by the piston crown 4 that delimits the combustion bowl 5, and its axially lower delimitation by the lower part 3 of the piston 1. Cooling oil is passed into the cooling channel 22 and passed out of the cooling channel 22 by way of inlet and outlet openings not shown in the figure.

During the assembly of upper part 2 and lower part 3, the coaxial alignment of these two parts is achieved in that the support land 15 is formed in step shape in cross-section, and the lower face of the ring wall 6 has a cylinder-shaped recess 23 on the inside, the inside shape of which corresponds to the outside shape of the support land 15, so that during assembly of the upper and lower part 2, 3 of the piston 1, the support land 15 can be introduced into the recess 23 and thereby the upper and lower part 2, 3 can be aligned coaxially.

On the side facing away from the combustion bowl 5, the piston crown 4 has a tube-shaped connection projection 24 disposed coaxial to the piston longitudinal axis 20, the length of which does not exceed the distance from the piston crown 4 to the pin bosses 17, 17'. The outside of the end of the connection projection 24 that faces away from the piston crown 4 is provided with an outside thread 25. Furthermore, the inside of the support rib 12 has an inside thread 26 close to the piston crown 4. In this connection, the radii of the support rib 12 and the connection projection 24 are selected in such a manner that the radial diameter of the inside thread 26 of the support rib 12 is greater than the radial diameter of the outside thread 25 of the connection projection 24. Furthermore, the axial distance between the outside thread 25 and the pin bosses 17, 17' is less than the axial distance between the inside thread 26 and the pin bosses 17, 17'.

In order to screw the upper part 2 and the lower part 3 together with one another by way of the two threads 25 and 26, a tube-shaped intermediate sleeve 27 is therefore required, the length of which corresponds to the difference in the distance between the outside thread 25 and the pin bosses 17, 17' and the distance between the inside thread 26 and the pin bosses 17, 17', and which has an inside thread 28 and an outside thread 29 at least at its ends, whereby the thread 28 that lies on the inside fits onto the outside thread 25 of the connection projection 24, and the thread 29 that lies on the outside fits onto the inside thread 26 of the support rib 12. Because the intermediate sleeve 27 comes into contact with the connection projection 24 and the support rib 12 only in the region of the thread connections 25, 26, 28, 29, it is guaranteed that during assembly of upper and lower part 2, 3 of the piston 1, the connection projection 24 experiences expansion, and the intermediate sleeve 27 experiences compression, by means of which deformations mechanical stress that serves to fix the connections is exerted on the thread connections between upper part and lower part 2, 3 of the piston 1. So that the deformations of the connection projection 24 and the intermediate sleeve 27 that serve to fix the thread connections are sufficiently great, the wall thickness of these parts must be dimensioned accordingly.

In the exemplary embodiment according to the figure, the connection projection 24 has a screw flange 30 with the outside thread 25 at its end facing the pin bosses 17, 17', the thread 28 that lies on the inside is disposed on the entire inside of the intermediate sleeve 27, and the end of the intermediate sleeve 27 that faces the piston crown 4 also has a screw flange 31 with the thread 29 that lies on the outside. In this way, the conditions required for deformation of the intermediate sleeve 27 and the connection projection 24, as described above, are met.

FIG. 2 shows an enlarged view of the screw connection between the upper part 2 and the lower part 3 of the piston 1, which takes place by way of the intermediate sleeve 27. For this purpose, the connection projection 24 has the screw flange 30 on its end facing away from the piston crown 4, which flange carries the outside thread 25 on its circumference surface that lies radially on the outside. The intermediate sleeve 27 has the thread 28 on its entire surface that lies radially on the inside, onto which the outside thread 25 of the screw flange 30 fits. On its end facing the piston crown 4, the intermediate sleeve 27 also has a screw flange 31, which carries the thread 29 on its circumference surface that lies radially on the outside, which thread fits onto the inside thread 26 that is disposed on a surface of the support rib 12 that lies radially on the inside and borders on the upper part 2. In this connection, the face 32 of the intermediate sleeve 27 that lies on the piston crown side forms a common, level contact surface for the upper part 2 of the piston 1, with the contact surface 13 disposed on the support rib 12.

Assembly of the piston 1 takes place in simple manner, in that first the intermediate sleeve 27 is screwed into the ring rib 12 of the lower part 3, and subsequently the upper part 2 of the piston 1 is screwed into the thread 28 of the intermediate sleeve 27, which lies on the inside, by way of the outside thread 25 of the connection piece 24. When the upper part 2 and the lower part 3 are screwed together, the lower contact surface 11 of the upper part 2 first comes into contact with the contact surface 13, 32 formed by the support rib 12 and the intermediate sleeve 27, and afterwards, further tightening of the upper part 2 on the lower part 3 results in the effect that the connection projection 24 experiences expansion in the direction of the arrow 33, and the intermediate sleeve 27 experiences compression in the direction of the arrow 34. Because of these deformations, mechanical stress is exerted, in particular, on the thread connection 25, 28 between the connection projection 24 and the intermediate sleeve 27, and this makes a significant contribution to fixation of this thread connection 25, 28.

REFERENCE SYMBOL LIST 1 piston
2 upper part of piston 1
3 lower part of piston 1
4 piston crown
5 combustion bowl
6 ring wall
7 top land
8 ring belt
9 inner contact region
10 outer contact region
11 contact surface
12 support rib
13,14 contact surface
15 support land
16 contact surface
17, 17' pin boss
18, 18' pin bore
19, 19' faces of the pin bores 18, 18'
20 piston longitudinal axis
21 piston skirt element
22 cooling channel
23 recess
24 connection projection
25 outside thread
26 inside thread
27 intermediate sleeve
28, 29 thread of the intermediate sleeve 27
20, 31 screw flange
32 face of the intermediate sleeve 27
33, 34 arrow

The invention claimed is:

1. Multi-part piston (1) for an internal combustion engine having an upper part (2) that has a piston crown (4), on which part a ring wall (6) having a ring belt (8) is molded on, and having a lower part (3) that is connected with the upper part (2) by way of a screw connection (12, 24-31) and has pin bosses (17, 17') having pin bores (18, 18') on its lower side facing away from the upper part (2), and having piston skirt elements (21) connected with the pin bosses (17, 17'), wherein the screw connection consists of the following elements:

of an essentially tubeshaped connection projection (24) that is affixed on the underside of the piston crown (4) and is disposed coaxial to the piston longitudinal axis (20), and has an outside thread (25) on its end that faces away from the piston crown (4) in the axial direction, said thread being disposed on a circumferential side of the connection projection (24) that lies radially on the outside of the connection projection, of a support rib (12), said support rib being molded onto the lower part (3), said rib having an inside thread (26) on its piston crown end, viewed in the axial direction, said thread being disposed on a surface that lies radially on the inside of said rib, and of an essentially tube-shaped intermediate sleeve (27) having a thread (28) that lies on the inside and a thread (29) that lies on the outside, by means of which the upper part (2) can be screwed together with the lower part (3), by way of the connection projection (24), and by way of the support rib (12), and which sleeve is configured in such a manner that when this happens, the connection projection (24) can be expanded and the intermediate sleeve (27) can be compressed.

2. Piston according to claim 1, wherein the thread (29) that lies on the outside is disposed on a circumference surface of the piston crown end of the intermediate sleeve (27), which surface lies radially on the outside, and fits into the inside thread (26) of the support rib (12), and that the thread (28) that lies on the inside is disposed on a surface of the intermediate sleeve (27), which surface lies radially on the inside, and fits onto the outside thread (25) of the connection projection (24).

3. Piston according to claim 2, wherein the axial distance between the inside thread (26) of the support rib (12) and the piston crown (4) is less than the axial distance between the outside thread (25) of the connection projection (24) and the piston crown (4), and that the radial diameter of the inside thread (26) is greater than the radial diameter of the outside thread (25).

4. Piston according to claim 1, wherein the wall thickness of the connection projection (24) and that of the intermediate sleeve (27) are dimensioned in such a manner that when the upper part (2) is screwed together with the lower part (3), by way of the connection projection (24) and by way of the intermediate sleeve (27), the connection projection (24) can be expanded to such an extent, and the intermediate sleeve (27) can be compressed to such an extent that in this way, a mechanical stress that serves to fix the screw connection (12, 24-31) in place can be generated.

5. Piston according to claim 1, wherein the connection projection (24) has a screw flange (30) having the outside thread (25), on its end facing away from the piston crown (4), that the thread (28) that lies on the inside is disposed on the entire inside of the intermediate sleeve (27), and that the intermediate sleeve (27) has a screw flange (31) having the thread (29) that lies on the outside, on its end that faces the piston crown (4).

\* \* \* \* \*